United States Patent

[11] 3,627,338

| [72] | Inventor | Sheldon Thompson<br>2187 Twelfth St., Sarasota, Fla. 33577 |
|---|---|---|
| [21] | Appl. No. | 864,996 |
| [22] | Filed | Oct. 9, 1969 |
| [45] | Patented | Dec. 14, 1971 |

[54] VACUUM CHUCK
16 Claims, 3 Drawing Figs.

[52] U.S. Cl. ................................................. 279/3,
51/235
[51] Int. Cl. ....................................................... B23b 31/30
[50] Field of Search .......................................... 279/3;
269/21; 51/235

[56] References Cited
UNITED STATES PATENTS
| 2,443,987 | /1948 | Morrison et al. .............. | 279/3 X |
| 3,052,479 | 9/1962 | LaTrell .......................... | 279/3 |

FOREIGN PATENTS
| 815,752 | /1959 | Great Britain................. | 269/21 |

*Primary Examiner*—Andrew R. Juhasz
*Assistant Examiner*—James F. Coan
*Attorney*—Beveridge & De Grandi ABSTRACT: A vacuum chuck having a workpiece holding face including a plurality of concentric circular grooves therein dimensioned to removably receive an elongated resilient sealing member which projects from the face of the chuck to seal against the workpiece when a vacuum is applied to the area enclosed by the seal below the workpiece. Vacuum is applied to the face of the chuck through a passage which terminates in a port opening in the face of the chuck in a diametrically extending cross groove which intersects all the circular grooves. The cross groove is also employed to receive the opposite ends of the sealing member, which is discontinuous to enable the sealing member to be adjusted into any one of the circular grooves depending on the size of the workpiece.

PATENTED DEC 14 1971 3,627,338

INVENTOR
SHELDON THOMPSON

BY Beveridge & De Grandi

ATTORNEYS 3,627,338

VACUUM CHUCK

SUMMARY OF THE INVENTION

The present invention relates to chucks in general, and more particularly to a vacuum chuck such as may be employed on lathes to hold a thin sheet of stock or other similar material.

One of the objects of the present invention is to provide an improved vacuum chuck of the aforedescribed type.

A further object of the present invention is to provide a vacuum chuck which will effectively hold a workpiece with efficient application of vacuum to the workpiece.

Another object of the present invention is to provide a vacuum chuck which may be quickly and easily adjusted to hold workpieces of various sizes.

A still further object of the present invention is to provide such a vacuum chuck incorporating a novel seal for maintaining the vacuum which holds the workpieces against the chuck.

Yet another object of the present invention is to provide such a vacuum chuck which will accomplish the foregoing objectives and at the same time may be relatively economically manufactured with a durable construction that will withstand repeated use.

In one embodiment of the invention, the above objects are achieved by a chuck body having a workpiece holding face including a plurality of concentric annular grooves therein dimensioned to removably receive an elongated resilient sealing member which projects above the face of the chuck to establish a seal against the workpiece when a vacuum is introduced into the space inwardly of the seal below the workpiece. Application of the vacuum to the face of the chuck is through a passage which terminates in a port opening into the face of the chuck in a diametrical cross groove which intersects all the annular grooves. The sealing member is discontinuous to allow it to be adjusted in circumferential length and placed into any one of the concentric annular grooves. The sealing member is secured in the chuck by placing its opposite ends in side-by-side abutting relationship in the cross groove which thereby also functions to accommodate relocation of the sealing member in any one of the concentric annular grooves.

In another embodiment of the invention, the sealing member is also secured by placing its opposite ends in the crosspiece but with the opposite ends extending in opposite directions in linear alignment rather than in side by side relationship.

To effect a good seal against the workpiece, the seal member is made from a closed cell resilient material which expands due to the differential pressure thereacross when a vacuum is produced inwardly of the seal. Since the cells of the sealing member are closed, the sealing member will expand at its exposed portion above the chuck face when the vacuum is applied inwardly of the sealing member. This expansion of the seal produces increased surface contact with the workpiece thus establishing a highly effective seal.

Other object and advantages of the present invention will become apparent from the following more detailed description taken in conjunction with the attached drawings in which.

DETAILED DESCRIPTION

Figure 1:
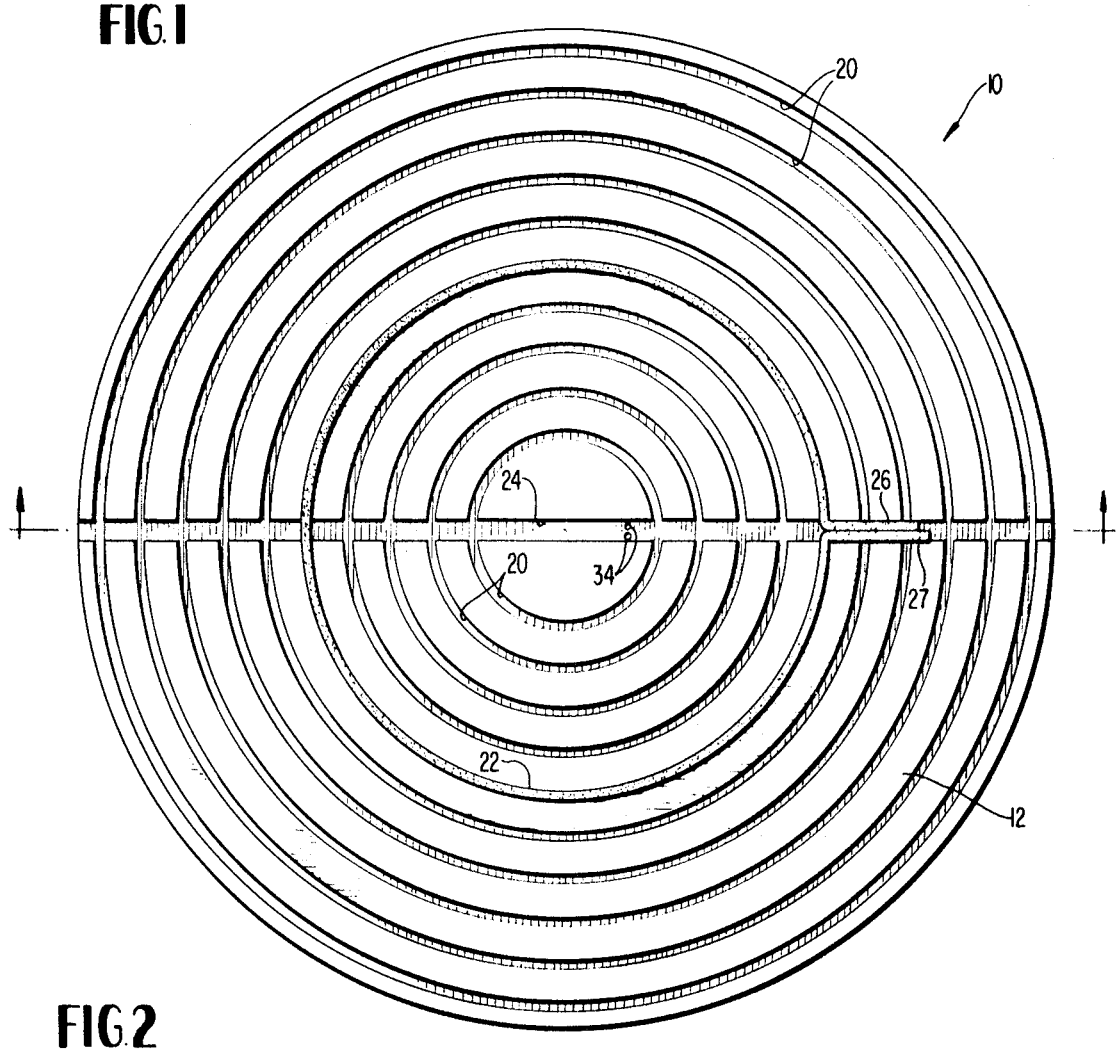
FIG. 1 is a plan view of a vacuum chuck embodying the present invention.

Referring now to the drawings in detail, there is illustrated a vacuum chuck generally designated 10 embodying the present invention and including a generally circular body which may be made for many suitable material such as aluminum. Chuck body 10 has a workpiece holding face 12 against which a workpiece such as a thin sheet 14 is held by vacuum as will be described in greater detail. Although not shown, any conventional screw or clamp structure may be employed to mount the vacuum chuck to a conventional lathe or other machine so that chuck body 10 rotates about its central axis designated 16. In addition a vacuum passage 18 is provided axially through the center of the body 10 for connecting a vacuum pump to the chuck for producing vacuum for holding the workpiece as will be described.

Figure 2:
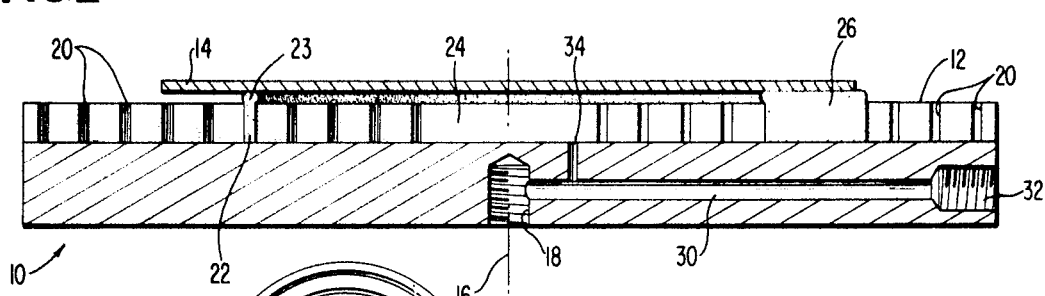
FIG. 2 is a cross-sectional view of the chuck taken generally along lines 2—2 of FIG. 1 and additionally illustrating a workpiece held by the chuck.

As shown in FIG. 1, a plurality of circular or annular concentric grooves or passages 20 are provided in the face 12 of the chuck body for receiving an elongated resilient seal member 22. Grooves 20 have an elongated generally U-shaped section corresponding to the cross section of sealing member 22 which is rectangular when unstressed. However, sealing member 22 is greater in depth than the depth of grooves 20 so that the portion of the sealing member projects upwardly from chuck face 12 for establishing a seal against the workpiece 14 as shown in FIG. 2. The width of sealing member 22 is such that it is snugly received in grooves 20 but it is also removable therefrom to permit placement into another concentric grooves to vary the suction area on the chuck depending on the size of the workpiece to be held by the chuck. For this reason sealing member 22 is made discontinuous and of sufficient length to enable it to be placed in the various concentric grooves.

In order to accommodate and secure sealing member 20 in any one of the grooves 20 a cross groove or passage 24 is provided in the chuck face 12 to extend diametrically across face 12 while intersecting all of the continuous grooves 20. In the FIG. 1 embodiment, cross groove 24 has a depth similar to the depth of circular grooves 20 but a width generally twice the width of grooves 20 to enable it to receive the opposite end portions 26, 27 of sealing member 22 to secure the sealing member as shown in FIG. 1.

Figure 3:
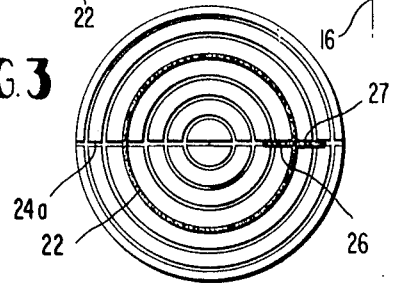
FIG. 3 is a plane view, to a reduced scale of another embodiment of the invention.

In the embodiment disclosed in FIG. 3, the width of cross groove 24a is the same as the circular grooves 20 so that the ends 26, 27 of the sealing member 22 are placed therein in opposite directions as illustrated. Thus, using cross groove 24, sealing member 22 may be placed in any of concentric grooves 20 since the length of cross groove 24 will accommodate the various lengths of end portions 26, 27 of sealing member 22 that will result depending on the circumferential distance of the sealing member which in turn, of course, will depend on the particular groove in which it is placed.

Gross groove 24 also provide another important function, namely transmitting vacuum to the face of the chuck inwardly of sealing member 22. To this end, vacuum passage 30 is formed to extend radially in the body of the chuck with one end communicating with passage 18 and another end communicating with a port 32 that may by plugged when the vacuum chuck is in use. One or more passages 34 are provided in the chuck body to communicate vacuum passage 30 with cross groove 24. Since cross groove 24 intersects all of concentric grooves 20, any vacuum introduced into the face of the chuck at ports 34 will be transmitted through cross groove 24 and onto the area on the face of the chuck enclosed by sealing member 22. This avoids the necessity, such as in conventional chucks of employing a plurality of sealing rings with vacuum ports between each successive sealing rings. Depending on the particular mounting of the chuck, the passage 32 may alternatively by employed to connect the chuck to a vacuum pump. In this case, passage 18 may be plugged.

In using the chuck, and assuming the chuck is properly mounted on a lathe and with a vacuum pump connected to passage 18, the operator first places sealing member 22 into a selected groove 20 depending on the size of the workpiece to be held by the chuck. This is accomplished by flexing sealing member 22 into a circular shape while moving it transversely downwardly into the selected groove until the sealing member rests on the bottom of groove 20. Sealing member 22 is secured by placing its end portions 26, 27 into cross groove 24. Workpiece 14 is then held on the face of the chuck with the workpiece engaging the projecting portions 23 of the sealing member, and then vacuum is applied through passages 18, 30, ports 34 and into cross groove 24 to evacuate the space beneath the workpiece enclosed by sealing member 22. This will cause the projecting portion 23 of sealing member 22 to expand transversely into good sealing relationship with the workpiece. Because sealing member 22 is made from a closed cell flexible material, expansion of the sealing member is enhanced due to the differential in pressure across the sealing member 22. This results in enhanced sealing engagement between the workpiece and the sealing member.

It will be apparent that the term "groove" as employed in this specification as well as the appended claims is to be construed broadly enough to cover any open passage whether it be formed in the chuck by milling, casting, or any other method. Moreover it will be understood that the term "annular grooves" as employed in the specification and claims would include grooves of elliptical, rectangular or polygonal patterns as well as the circular patterns in the drawings.

I claim:

1. A vacuum chuck comprising, a body having a workpiece holding face including means defining a first passage in said face for receiving a seal to enclose a space on said face to be evacuated, means defining a cross passage extending across said first passage, an elongated discontinuous flexible seal located in said first passage with its opposite ends received in said cross passage to define a continuous seal enclosing said space, the depth of the seal being such as to extend above said face of the chuck body, and said body further having passage means for transmitting suction to said space enclosed by said seal to evacuate the same.

2. The vacuum chuck defined in claim 1 wherein said last defined passage means includes a port opening in said cross passage inwardly of said seal.

3. The vacuum chuck defined in claim 1 wherein said seal is made with a closed cell construction such that when a workpiece is provided over said space and on said seal and a vacuum is applied to said space, portions of said seal extending above said chuck face will expand laterally against said workpiece to provide increased sealing engagement.

4. The vacuum chuck defined in claim 1 wherein said seal is removable from said first passage.

5. The vacuum chuck defined in claim 4 wherein said body has means defining a fourth passage surrounding said first passage, and wherein said cross passage also intersects said fourth passage, and wherein said seal is removable from said first passage and insertable into said fourth passage with the ends of seal located in said cross passage.

6. A vacuum chuck comprising, a body having a workpiece holding face including a plurality of continuous grooves therein including inner grooves and outer grooves extending around the inner grooves, and a cross groove extending across and intersecting the continuous grooves, an elongated seal located in one of said continuous grooves and extending throughout the same and above said face of the chuck body, and said body having passage means for transmitting suction to the space enclosed by said seal, and wherein said seal is discontinuous and has opposite ends received in said cross groove.

7. The vacuum chuck defined in claim 6 wherein said seal is dimensioned to be removable from said one groove and placed into another continuous groove to vary the space in which vacuum is applied on the workpiece holding face of the chuck.

8. The vacuum chuck defined in claim 7 wherein said seal is made from a closed cell resilient material such that when vacuum is applied on the workpiece face of the chuck inwardly of the seal, the seal will expand at its outer exposed portion to increase contact and thereby enhance the seal therewith.

9. Vacuum chuck comprising, a body having a workpiece holding face including a plurality of continuous grooves therein including inner grooves and outer grooves extending around the inner grooves, and a cross groove extending across and intersecting the continuous grooves, an elongated seal located in one of said continuous grooves and extending throughout the same and above the said face of the chuck body, and said body having a passage means for transmitting suction to the space enclosed by said seal, and wherein said seal is discontinuous and has opposite ends received in said cross groove.

10. The vacuum chuck defined in claim 9 wherein said cross groove has a width approximately twice the width of said continuous grooves to accommodate the end portions of the seal in side-by-side relationship.

11. The vacuum chuck defined in claim 9 wherein said cross groove has a width approximately equal to the width said continuous grooves for receiving the end portions of the seal in colinear oppositely extending directions.

12. The vacuum chuck defined in claim 9 wherein said passage means includes a port opening in said cross groove inwardly of said seal.

13. A vacuum chuck comprising, a body having a workpiece holding face including a plurality of continuous grooves therein including inner grooves and outer grooves extending around the inner grooves, and a cross groove extending across and intersecting the continuous grooves, an elongated seal located in one of said continuous grooves and extending throughout the same and above said face of the chuck body, and said body having passage means for transmitting suction to the spaced enclosed by said seal, and wherein said seal is removable from said one continuous groove for placement into another continuous groove to vary the space in which vacuum is applied on the workpiece holding face of the chuck, the cross groove being capable of receiving various lengths of seal such that the circumferential length of the seal may be adjusted to fit in one of the continuous grooves.

14. The vacuum chuck defined in claim 13 wherein said cross groove has a width approximately twice the width of said continuous grooves to accommodate the end portions of the seal in side-by-side relationship.

15. The vacuum chuck defined in claim 13 wherein said continuous grooves and said cross groove have a generally U-shaped cross section and wherein said seal has a generally rectangular cross section with the depth of the seal being greater than the depth of the grooves such that the seal will project from the workpiece holding face of the chuck.

16. The vacuum chuck defined in claim 13 wherein said cross groove has a width approximately equal to the width of said continuous grooves for receiving the end portions of the seal in colinear oppositely extending directions.

* * * * *